P. McGRATH.
RAILWAY SWITCH.
APPLICATION FILED JUNE 19, 1908.
926,816.
Patented July 6, 1909.
10 SHEETS—SHEET 4.
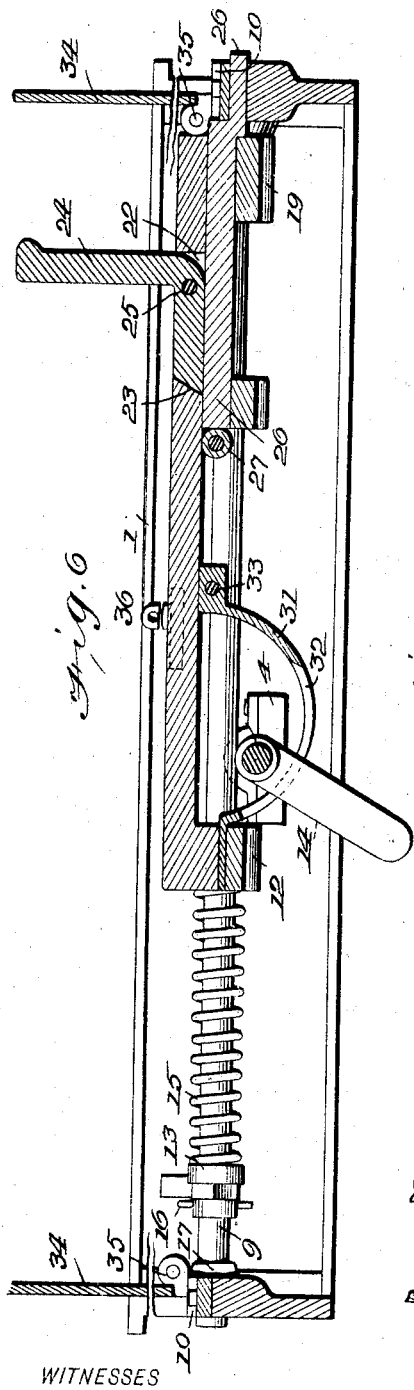
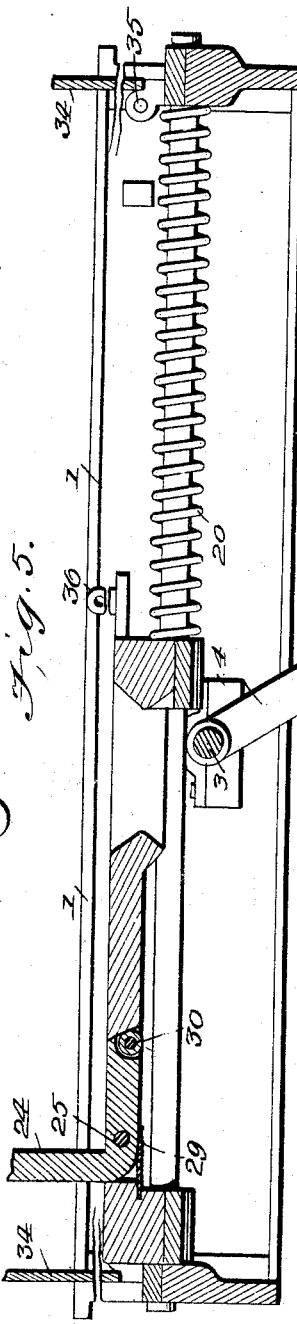
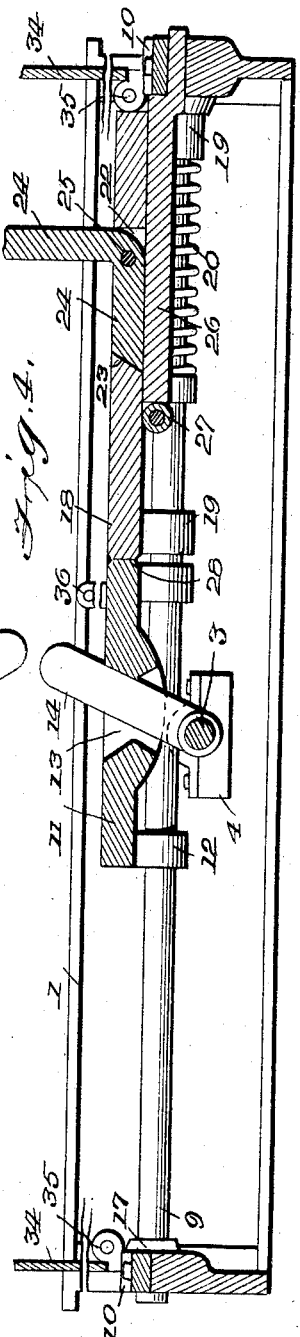
WITNESSES
INVENTOR
PETER McGRATH
BY
ATTORNEYS P. McGRATH.
RAILWAY SWITCH.
APPLICATION FILED JUNE 19, 1908.
926,816.
Patented July 6, 1909.
10 SHEETS—SHEET 5.
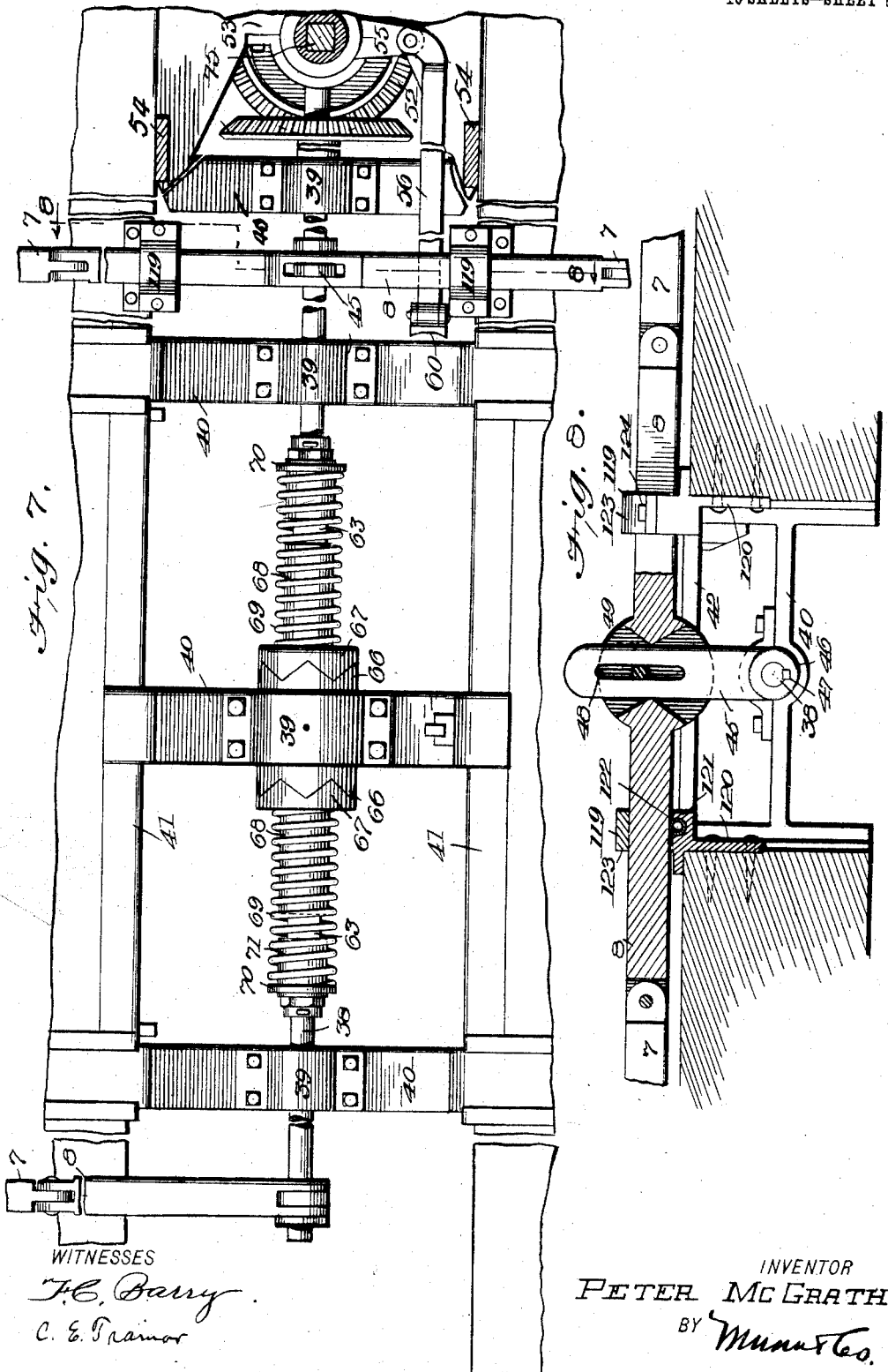
WITNESSES
INVENTOR
PETER McGRATH
BY
ATTORNEYS P. McGRATH.
RAILWAY SWITCH.
APPLICATION FILED JUNE 19, 1908.
926,816.
Patented July 6, 1909.
10 SHEETS—SHEET 6.
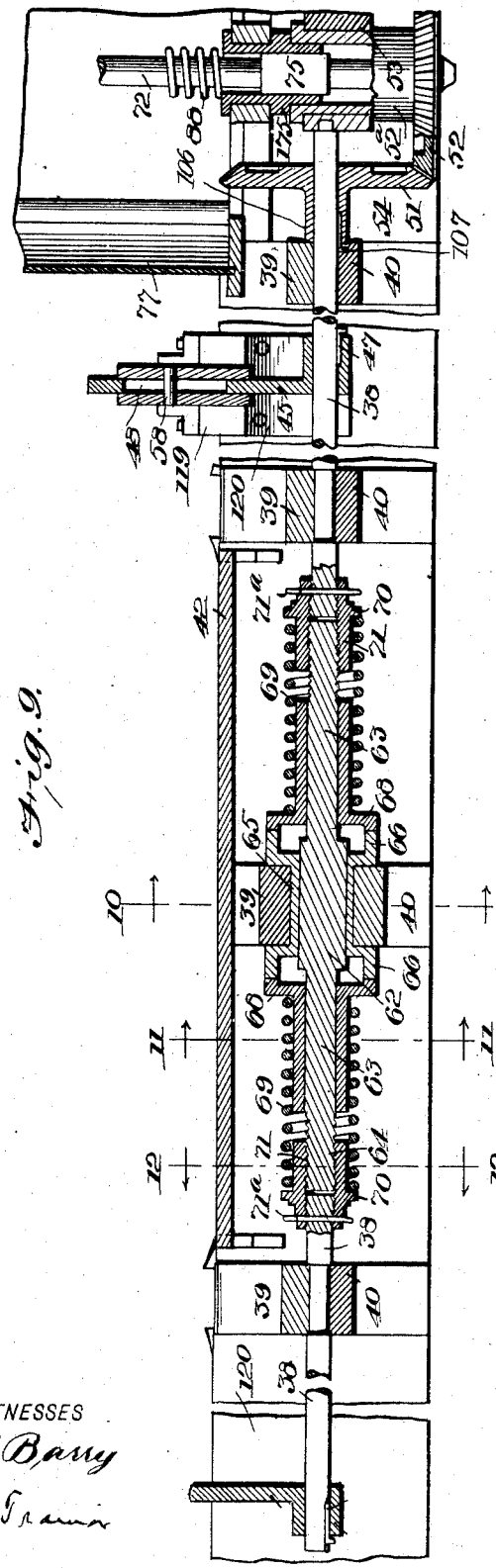
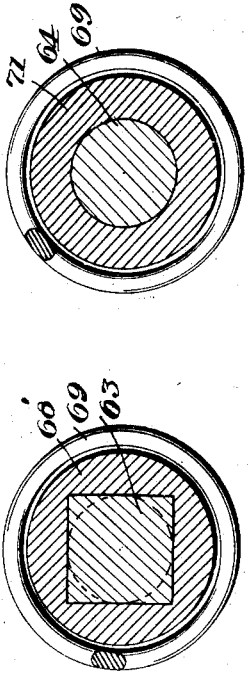
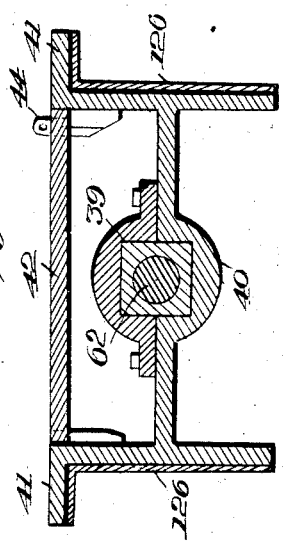
WITNESSES
INVENTOR
PETER McGRATH
BY Munn & Co.
ATTORNEYS

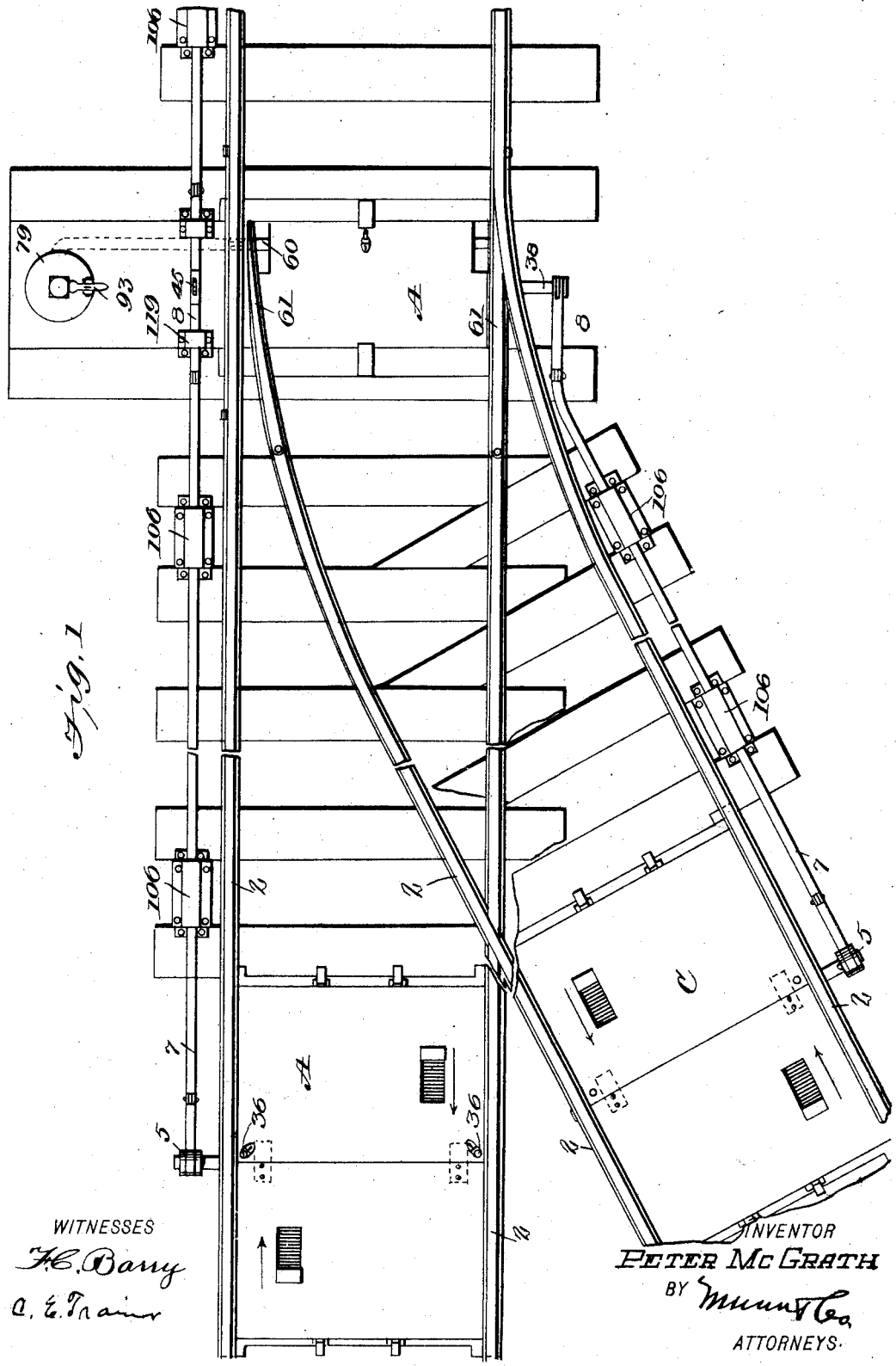

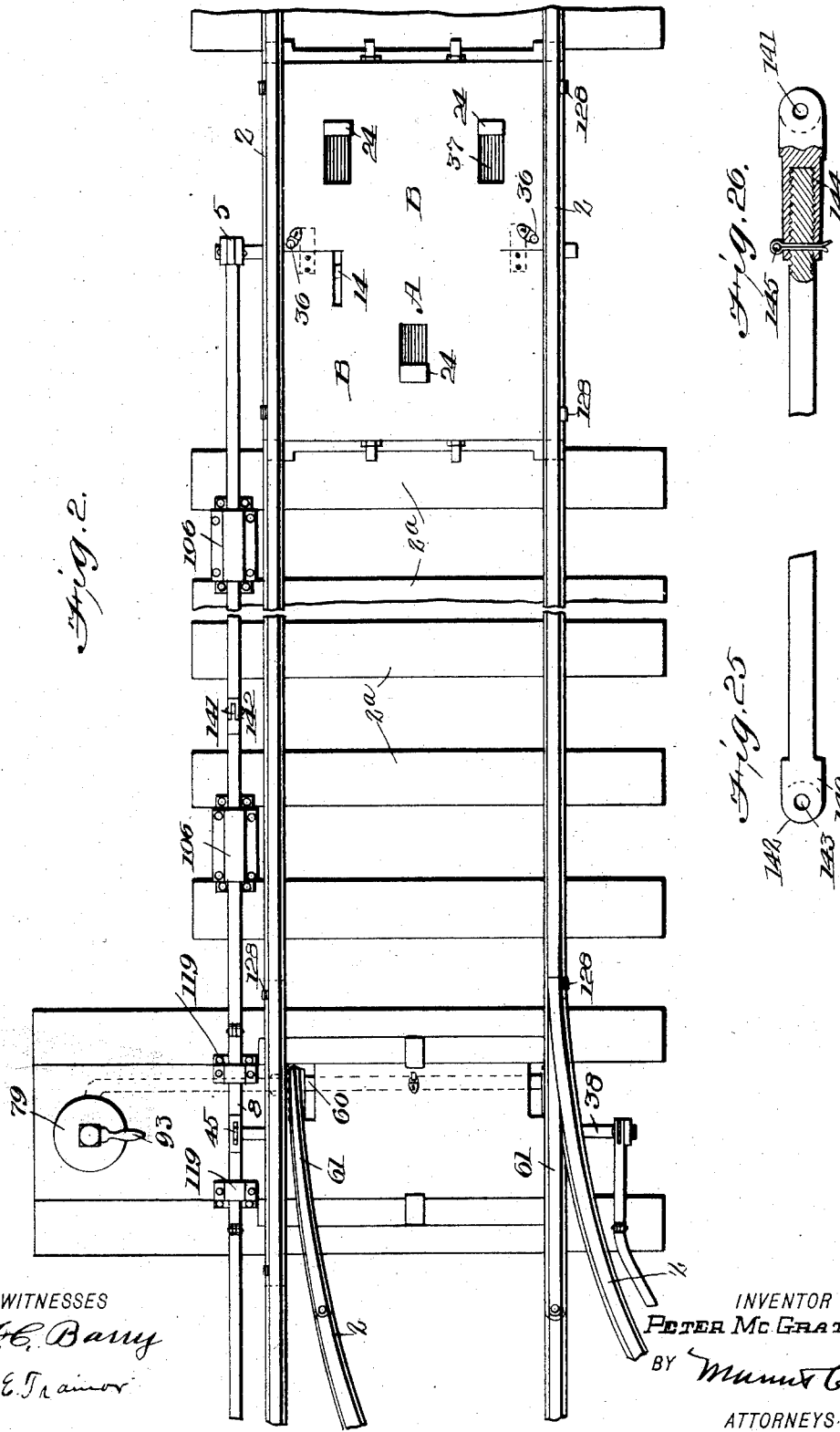

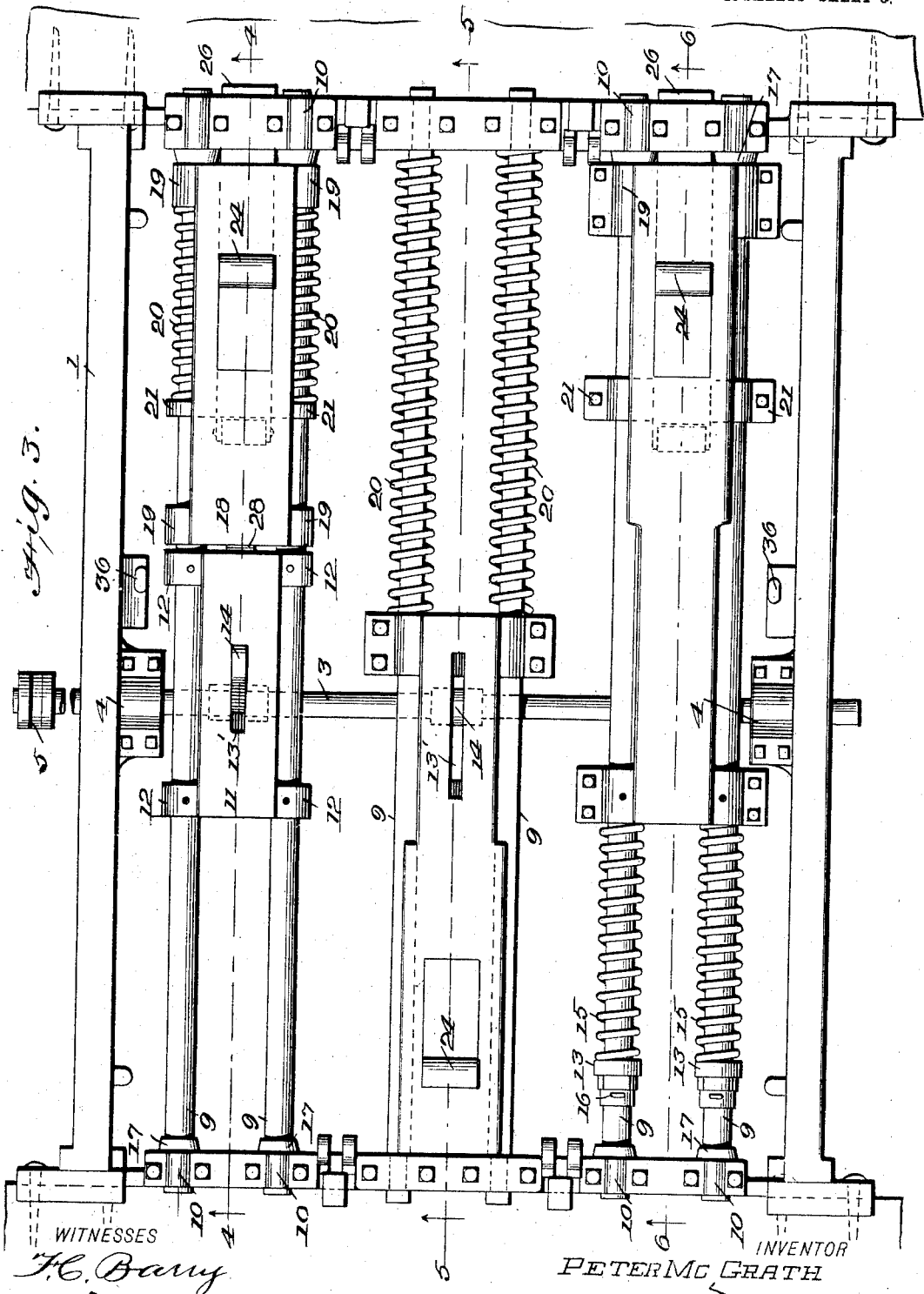

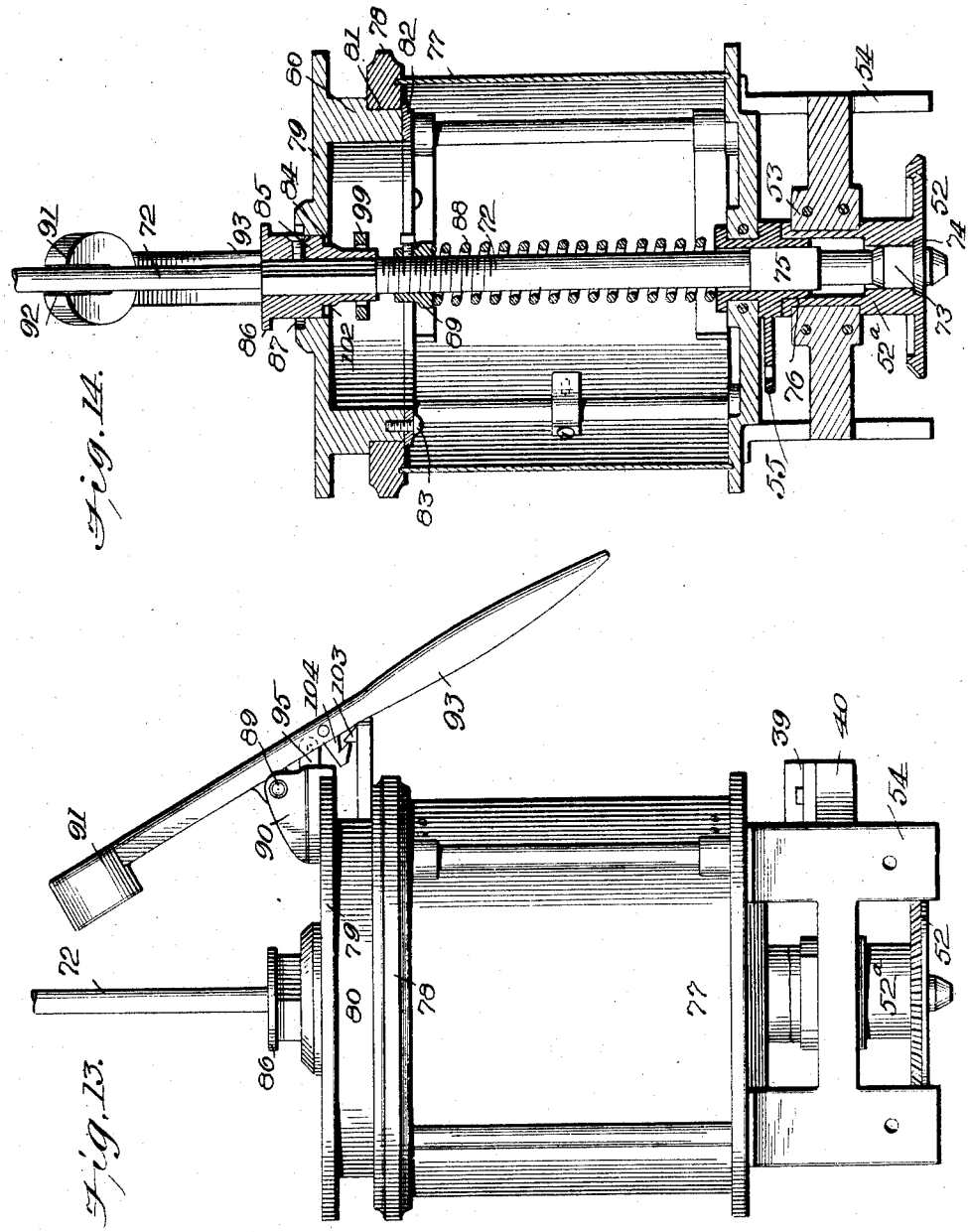

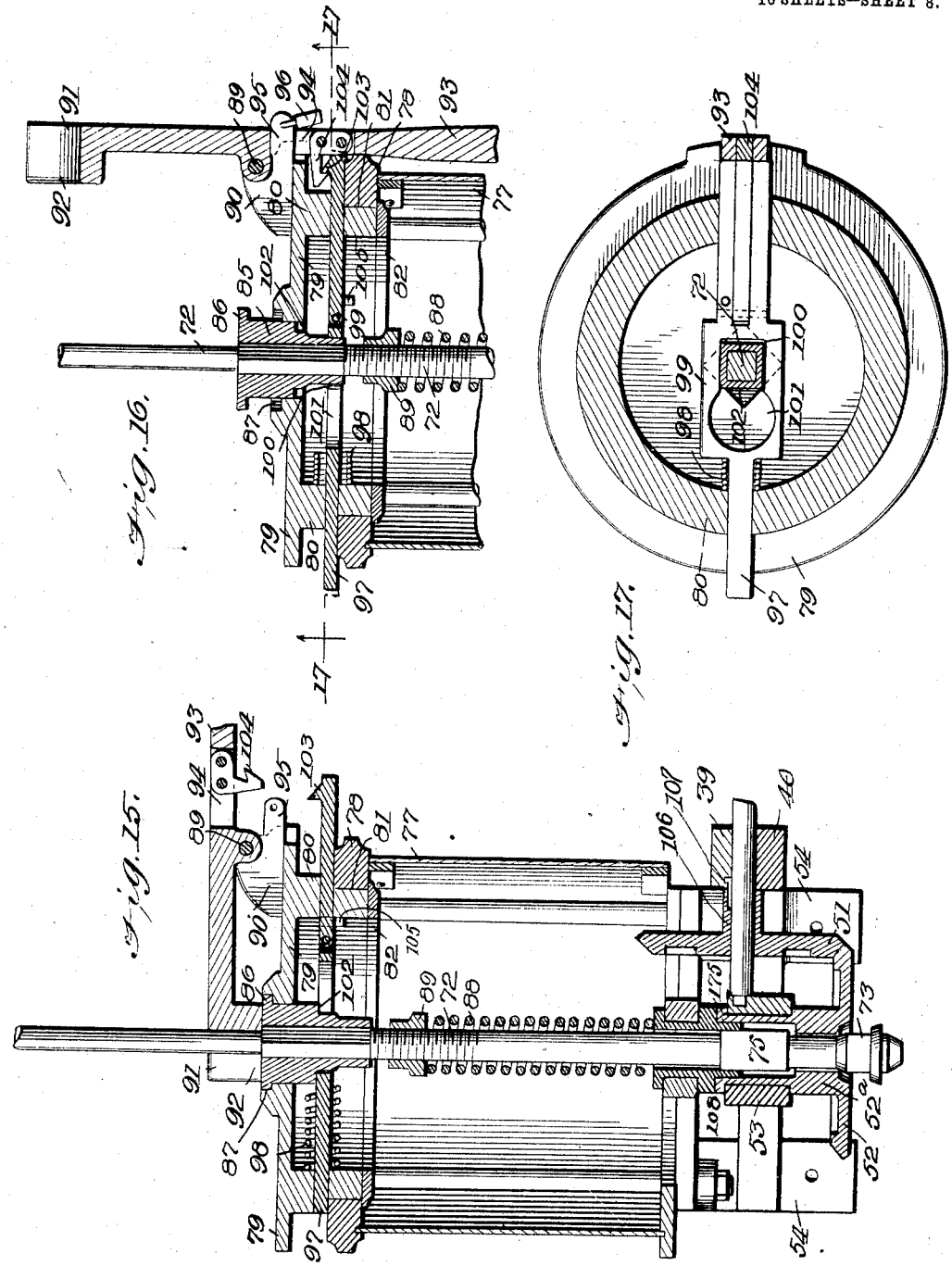

P. McGRATH.
RAILWAY SWITCH.
APPLICATION FILED JUNE 19, 1908.
926,816.
Patented July 6, 1909.
10 SHEETS—SHEET 9.
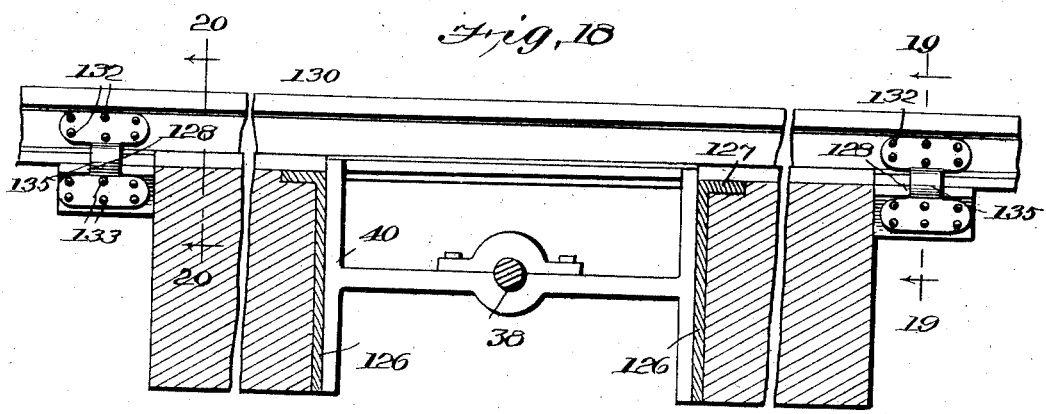
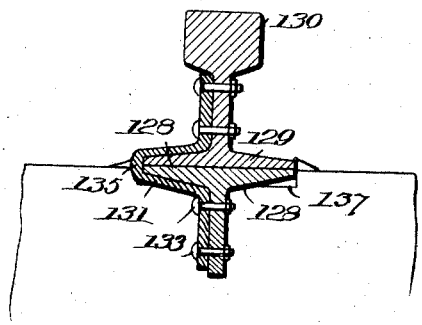
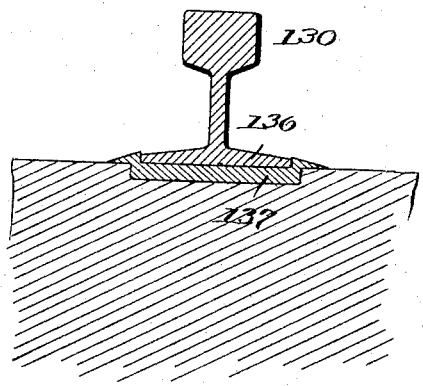
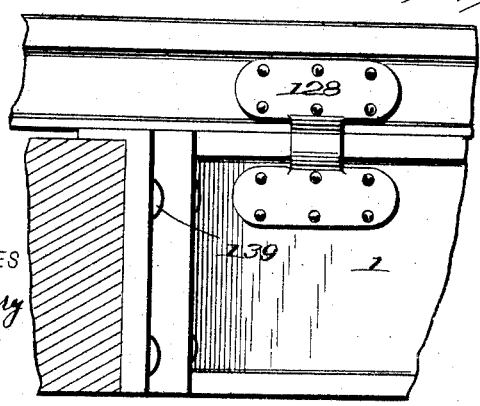
WITNESSES
INVENTOR
PETER McGRATH
BY
ATTORNEYS.

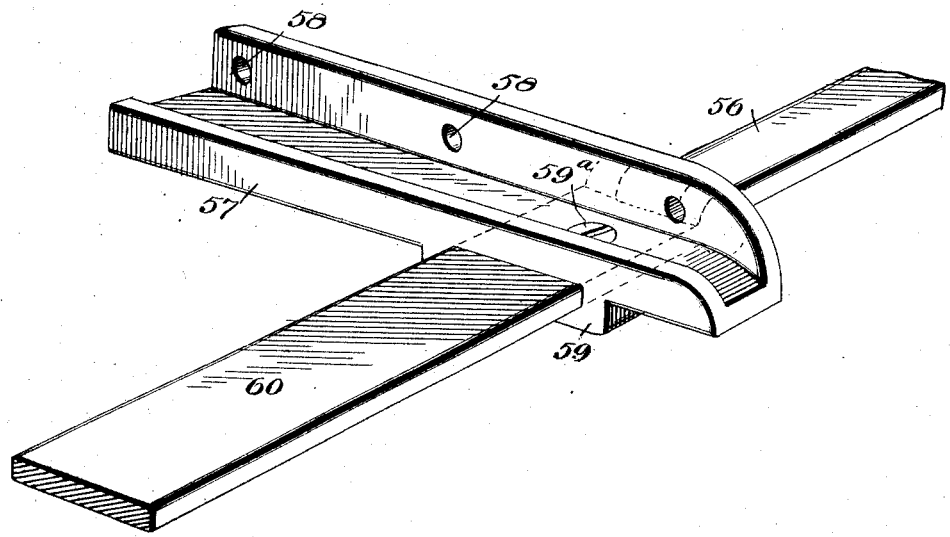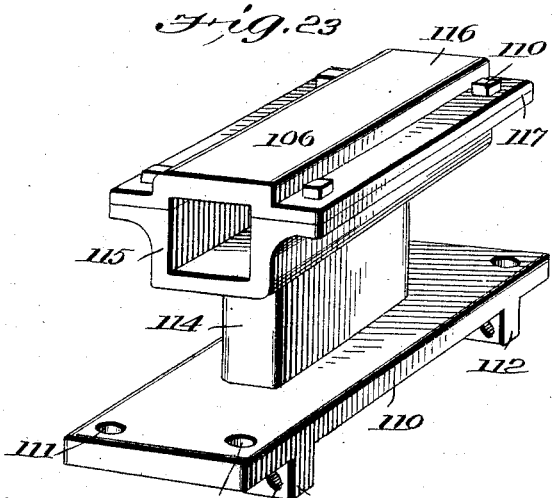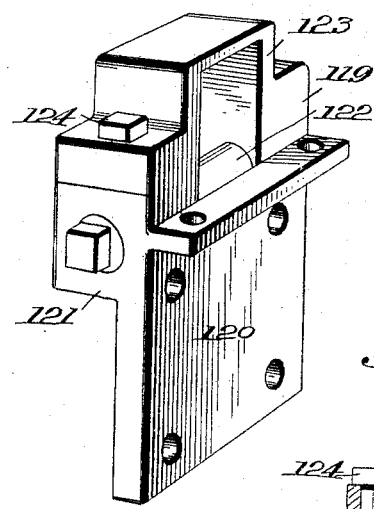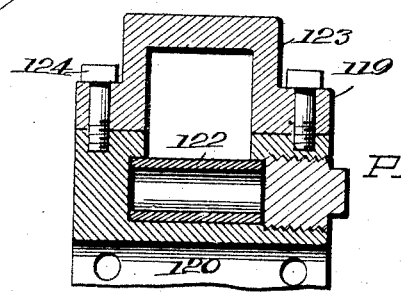

UNITED STATES PATENT OFFICE.

PETER McGRATH, OF DENVER, COLORADO.

RAILWAY-SWITCH.

No. 926,816.   Specification of Letters Patent.   Patented July 6, 1909.

Application filed June 19, 1908. Serial No. 439,328.

*To all whom it may concern:*

Be it known that I, PETER MCGRATH, a citizen of the United States, and a resident of Denver, in the county of Denver and State of Colorado, have invented certain new and useful Improvements in Railway-Switches, of which the following is a specification.

My invention is an improvement in railway switches, and consists in certain novel constructions and combinations of parts hereinafter described and claimed.

Referring to the drawings forming a part hereof, Figure 1 is a plan view of a section of track provided with the improvement. Fig. 2 is a similar view and complementary to Fig. 1. Fig. 3 is a plan view of the train operated mechanism showing the device with the cover removed. Fig. 4 is a section on the line 4—4 of Fig. 3. Fig. 5 is a section on the line 5—5 of Fig. 3. Fig. 6 is a section on the line 6—6 of the same figure. Fig. 7 is a plan view of the locking device. Fig. 8 is a section on the line 8—8 of Fig. 7. Fig. 9 is a longitudinal section of the locking device. Fig. 10 is a section on the line 10—10 of Fig. 9. Fig. 11 is a section on the line 11—11 of Fig. 9. Fig. 12 is a section on the line 12—12 of the same figure. Fig. 13 is a side view of the hand throwing device. Fig. 14 is a central longitudinal section of the same. Fig. 15 is a section at right angles to Fig. 14. Fig. 16 is a view of the upper portion of Fig. 15 showing the operating handle in locked position. Fig. 17 is a section on the line 17—17 of Fig. 16. Fig. 18 is an end view of the locking device parts thereof being omitted showing the manner of attaching the said device to the rails. Fig. 19 is a section on the line 19—19 of Fig. 18. Fig. 20 is a section on the line 20—20 of the same figure. Fig. 21 is a detail perspective view of the device for connecting a switch point with the operating bar. Fig. 22 is a detail perspective view of the bracket in which the sliding bar moves. Fig. 23 is a similar view of the bracket for supporting the connecting rods. Fig. 24 is a transverse section of a portion of Fig. 22. Fig. 25 is a detail of one end of the connecting rod. Fig. 26 is a modified form partly in section, and Fig. 27 is a detail side view of a portion of the box.

The present embodiment of my invention comprises a plurality of switch throwing devices arranged on each side of the switch, a locking device for locking the device in thrown position, and for insuring its complete throw, and a hand operating device which normally is disengaged from the switch.

The switch throwing devices are arranged upon each side of the switch, and are adapted to be operated by suitable mechanism on a moving car, and each of said devices consists of a frame 1 of suitable construction arranged between the rails 2 and provided at approximately its center with a transverse shaft 3, journaled in bearings 4 inside the frame, and provided at one end outside of the frame with an arm 5, whose free end is connected by a plurality of jointed rods 7, with a slide bar 8, to be presently described, forming a part of the locking device A. The frame 1 is also provided with a plurality of pairs of shafts or rods 9, having their ends arranged in bearings 10, and having slidable thereon a carriage 11, the carriage being provided at its corners with sleeves 12 which embrace the rods. The carriage is provided near one end with a slot 13, in which engages an arm 14, rigid with the shaft 3 before mentioned.

Three different forms of carriage and mounting are shown in Fig. 3 and more in detail in Figs. 4, 5 and 6. In the form shown in Fig. 4, the carriage is operated by an independent slide 18, provided at each corner with sleeves 19 embracing the rods 9, and spiral springs 20 encircle the rods, being arranged between the outer sleeves and collars 21 rigid with the rods. The slide 18 is provided with a substantial longitudinal slot 22, whose front edge is beveled downwardly as at 23, and an operating arm 24 is journaled in the slot as at 25, the operating arm comprising two portions arranged at right angles to each other, one of the portions being adapted to stand upright for engagement by the operating mechanism on the car, and the other end being adapted to lie in the slot, the free end thereof being beveled to fit the beveled surface 23. A platform 26 is arranged below the slide upon which the horizontal portion of the operating arm rests, and the free end of the platform is provided with a friction roller 27. When the vertical portion of the arm 24 is engaged by the operating mechanism on the car, and the slide is moved to the left of Fig. 4, the arm will remain in the position shown in Fig. 4 until the slot passes over the end of the platform, after which the horizontal portion of the arm will drop downward, permitting the vertical portion to turn into a substantial horizontal position, whereby to permit the operating mechanism to pass therefrom. Both the carriage and the slide are provided at their abutting ends with abutments 28 as shown in Figs. 3 and 4.

In Fig. 5, the platform 26 is dispensed with, and the operating arm is retained in operative position by means of a spring 29, and the free end of the horizontal portion is provided with a friction roller 30. The spring is of sufficient strength to retain the operating arm in operative position, during the movement of the carriage, but yielding to the force of the operating mechanism when the carriage stops. In this construction also, the carriage is integral with the slide.

In the construction shown, in Fig. 6, the carriage and the slide are integral and the arm 14 on the shaft 3 is turned downwardly, and an arc-shaped plate 31 is secured to the carriage, the plate being provided with a slot 32 for receiving the arm. One end of the arc-shaped plate 31 is pivoted to the carriage as at 33, and the other arm is inserted between the upper and lower members of the bearing or sleeve 12, which sleeve in the present construction is split as shown in Fig. 6. The frame 1 is provided with doors 34, for covering the top thereof, the doors being hinged as at 35 to the frame, and being provided with slots for engaging perforated lugs 36 on the frame, whereby the doors may be locked in closed position. The doors are also provided with slots 37, through which the operating arms project, the slots being of sufficient length to permit the movements of the arms.

It will be evident from the description, that when the operating arm 24 is engaged and moved by the operating mechanism on a moving car, the shaft 3 will be oscillated and through the connection of said shaft by the rods 7, with the switch operating mechanism, the switch will be thrown.

The operating mechanism comprises a shaft 38, journaled in bearings 39 on the cross bars 40, of a frame 41 arranged beneath the rails 2, and between the ties 2$^a$ of the track, the said frame being provided with a cover 42, hinged as at 43 to the frame, and provided with a slot for engaging a perforated lug 44 on the frame whereby to permit the cover to be locked in place. The shaft is provided at each end with an arm 45 provided with a bearing 46 for receiving the shaft and keyed thereto by a key 47, and the upper end of the arm is slotted as at 48, and passes through a slot 49 in one of the sliding bars 8 before mentioned, a pin traversing the sides of the slot 48 in the arm 45. The shaft has secured to one end a bevel gear wheel 51 meshing with a bevel gear wheel 52, whose hub 52$^a$ is journaled in a bearing 53, in a stand 54 to be presently described. The hub has rigid therewith an arm 55 connected by a link 56 with the switch bar 60 connected with the switch tongue 61, by means of a channel bar 57 having in one of its flanges a series of perforations 58 whereby it may be attached to the point, and provided on its under face with a bearing 59 for receiving the switchbar 60, the bar being secured to the channel bar by a screw 59$^a$. It will be evident from the description, that when the shaft 38 is oscillated, the elbow lever will be operated to throw the switch in one or the other direction, depending upon the operating arm 24 which has been engaged.

Mechanism is provided for insuring the complete throw of the switch and for locking it in its closed position.

The shaft 38 is provided near its center with an enlarged circular portion 62, and upon each side thereof with squared portions 63 and at the ends of the squared portions the shaft is threaded as at 64. Upon the rounded portions 62 is journaled a sleeve 65, having a reduced portion for receiving the bearing 39, and each of the ends of the sleeve is provided with a plurality of teeth 66, coöperating with teeth 67 on the enlarged end of a sleeve 68, which is slidable on the squared portion of the shaft, the teeth being normally retained in engagement with each other by a coil spring 69, arranged between the enlarged portion of the sleeve, and a flange 70, on a collar 71, threaded onto the threaded portions 64 of the shaft, and locked by a cotter pin 71$^a$.

The hub 52$^a$ of the gear wheel 52 before mentioned, is provided with a central opening through which passes a rod 72, the rod having near its lower end a squared portion 73, engaging a corresponding recess in the hub, and being provided with a collar 74 engaging a counter sink in the bevel gear. The rod is also provided with a square portion 75 near the upper end of the stand which is adapted to move in a similarly shaped recess 76 in the upper end of the hub, when the said shaft is moved longitudinally with respect to the hub, the square portion being of a length to remain in engagement with the hub at all times.

A casing 77 is supported by the stand 54 before mentioned, and the rod 72 before mentioned passes upwardly through the said casing and out at the upper end thereof. The casing is provided with a ring top, in which is rotatably mounted a cover 79 having an annular flange 80, provided in its lower edge with an annular recess 81, for receiving the inner edge of the ring, and a ring 82 is connected with the lower edge of the flange by screws, the outer edge of the ring extending beneath the ring 78, whereby to prevent upward movement of the cover with respect to the ring. The top of the cover is provided with a square opening 84 for receiving a square nut 85, secured to the shaft 72, by a screw 86ª, and the nut 85 is provided with an annular flange 86 which is received in a correspondingly shaped recess 87 in the cover whereby to limit the downward movement of the nut. The shaft is vertically movable, and is normally retained in its uppermost position by a coil spring 88 which encircles the shaft and bears against a nut 89 threaded on to the shaft, and against the top of the stand. A handle 88 is pivoted as at 89 to a lug 90 on the cover, and the handle is provided with a forked portion 91 for receiving the shaft 72, and with a bearing surface 92, for engaging the top of the nut 85 whereby to depress the shaft. The handle is also provided with a grip 93 for convenience in manipulating the same, and with a slot 94 for receiving a perforated lateral extension on the lug 90, the perforation being adapted to receive a lock 96, whereby to lock the handle in inoperative position. A slide 97 is arranged to move transversely of the cover the slide being normally retained in the position shown in Fig. 15 by the coil spring 98 encircling the same, and bearing at one end against the cover, and at the other against an enlarged portion 99 of the slide, and the enlarged portion is provided with a slot which is square at one end as at 100, and round at the other as at 101, and the shaft 72 and the nut 85 pass through the said slot, the nut being provided with a squared portion 102, for engaging the square end of the slot when the slide is in the position shown in Figs. 16 and 17, whereby to prevent rotation of the shaft 72. The outer end of the slide is provided with a lug 103, which is adapted to be engaged by a catch 104 pivoted in the slot 94 of the handle, so that when the handle is lifted to the position shown in Fig. 15, the slide will be withdrawn a sufficient distance to insure the disengagement of the square end of the slot from the square portion of the nut. The slide is also provided with a stop 105, for engaging the cover to limit the outward movement of the slide. It will be evident from the description, that when the handle 93 is lifted into the position shown in Fig. 15, and the shaft 72 depressed to disengage the square portion 73 from the opening of the hub the locking mechanism and the switch operating mechanism will be disengaged from the hand operating mechanism, whereby to permit the switch to be thrown by hand, by swinging the handle 93 to the right or the left depending upon the direction in which it is desired to throw the switch. From an inspection of Figs. 9 and 15, it will be noticed that the bevel gear wheel 51 is provided with a hub 106 encircling the shaft 38, and retained thereon by the key 107, and that the free end of the shaft 38 is journaled in an opening in the bearing 53.

The device is shown as applied to a switch movable in two directions, and three operating devices are shown in position, in Figs. 1 and 2, which as before stated are complementary views, the operating mechanism being arranged at suitable distances on each side of the switch. The main line is provided with an operating mechanism A at the right of the switch, and an operating mechanism B at the left of the switch, and an operating mechanism C is shown on the branch track, each of said mechanisms being connected by the jointed rods 7 with the switch bar 60, the said rods moving through bearings 106 arranged at suitable intervals on the ties. Each operating mechanism is provided with a suitable number of operating arms, sundry of said arms being movable in one direction, and the other arms being movable in the other direction. Mechanism B shown in Fig. 2 is arranged to throw the switch in either direction, and operating by trains advancing toward the switch, and to throw the switch into closed position as shown in the said figure by trains moving from the switch, and the mechanism A is arranged to throw the switch into open and closed position by trains advancing toward or from the switch, while the mechanism C is arranged to open the switch by trains approaching the same to permit said trains to pass out on the main line and to throw the switch to closed position by trains passing from the main line on to the switch.

It will be noticed that the hand operating device comprising the shaft 72, and the lever 93 are normally connected with the locking device, and with the means to be operated by a moving train for throwing the switch, but when the operating lever is in position for operating the switch by hand, the act of placing the lever in such position disconnects the locking device, and the train operated means from the hand operating means. This arrangement is for the purpose of permitting the shaft 72 which bears a switch light at the top, and a target in the usual manner to be rotated by the train operated device, to show the position of the switch to an approaching train, while at the same time it may be disconnected when it is desired to operate the switch by hand.

The bearing 106 through which the connecting rods slide and shown more particularly in Fig. 23, comprises a base 110 which is adapted to be secured to two ties being provided at each end with openings 111, and with lugs 112 on its bottom face, also provided with openings 113, the openings 111, 113 being adapted to permit the passage of spikes, whereby to secure the bearing to the ties, the ties engaging the lug 112. Arising from the base is a pedestal 114 having integral therewith the lower section 115 of the bearing proper, both the lower section 115 and the upper section 116 being flanged as at 117, and bolts 118 traverse the flanges for securing them together.

The bar 8 slides through bearings 119 secured to the ties as at 120, the said bearings comprising a base portion 121, having a recess in which is received a section of pipe 122 forming a friction roller on which the bar slides, and an upper portion 123 secured to the lower portion by the bolts 124.

The locking device is adapted to be arranged between two ties 125 as shown in Fig. 18, and the side plates 126 of the locking device are provided with laterally extending flanges 127, which extend beyond the adjacent tie, and are provided with horizontal flanges 128 adapted to engage the base 129 of the rail 130, and clamps 131 are bolted to the web of the rail as at 132, and to the laterally extending portion as at 133, the clamps having an outwardly bent portion 135 extending around the flanges as shown in Figs. 19 and 20. The laterally extending portion 127 is provided with a recess 136 for receiving the rail base, and the tie is recessed as at 137 for receiving such portion.

The frames 1 are bolted to the ties as at 139 and are secured to the rails by the clamps 128 before mentioned as shown in Fig. 18.

The connecting rods shown in Figs. 25 and 26, may be provided at one end with an integral head 140 having a single lug 141 or a pair of spaced lugs 142, the lugs being traversed by openings 143, or one of the heads may be provided with a hollow internally threaded socket 144, the end of the head being threaded into the socket and secured by a cotter pin 145, as shown in Fig. 26. It is obvious that either or both ends of the rod may be arranged as shown in Fig. 25 or as shown in Fig. 26.

I claim:

1. The combination with the switch, of a shaft arranged transversely of the switch and connected therewith to operate the switch when the shaft is oscillated, a locking device for the switch in connection with the shaft, and means on each side of the switch adapted to be operated by a moving train for throwing the switch, said means comprising a shaft arranged transversely of the track, a connection between the said shaft and the first named shaft whereby they will oscillate in unison, rods arranged transversely of the shaft, and in parallel relation, a carriage slidable on the rods, springs for retaining said carriage at one end of the rods, the carriage being provided with a slot therethrough, and an operating arm pivoted in the slot, the said arm having a horizontal portion lying within the slot, and a vertical portion for engagement by a moving train, a spring for retaining the arm in normal position, and means whereby the movement of the carriage will oscillate the shaft.

2. The combination with the switch, of a shaft arranged transversely of the switch and connected therewith to operate the switch when the shaft is oscillated, a locking device for the switch in connection with the shaft, and means on each side of the switch adapted to be operated by a moving train for throwing the switch, said means comprising a shaft arranged transversely of the track, a connection between said shaft and the first named shaft whereby they will oscillate in unison, rods arranged transversely of the shaft and in parallel relation, a carriage slidable on the rods, springs for retaining said carriage at one end of the rods, a spring supported arm pivoted to the carriage for engagement by mechanism on a moving train, and means whereby the movement of the carriage will oscillate the shaft.

3. The combination with the switch, of a shaft arranged transversely of the switch and connected therewith to operate the switch when the shaft is oscillated, a locking device for the switch in connection with the shaft, and means on each side of the switch adapted to be operated by a moving train for throwing the switch, said means comprising a shaft arranged transversely of the track, a connection between the said shaft and the first named shaft whereby they will oscillate in unison, a carriage slidable transversely of the last named shaft, an operating arm pivoted to the carriage, and adapted for engagement by means of a moving train whereby to move the carriage in one direction, a spring for returning the carriage, and means whereby the movement of the carriage will oscillate the shaft.

4. The combination with the switch, of a shaft arranged transversely of the switch, and connected therewith to operate the same when the shaft is oscillated, a locking device for the switch in connection with the shaft, and means on each side of the switch adapted to be operated by a moving train for throwing the switch, said means comprising a carriage movable longitudinally of the track, an operating arm pivoted thereto, and provided with a vertical portion for engagement by mechanism on a moving train to move the carriage in one direction, springs for returning the carriage, and means whereby the movement of the carriage will oscillate the shaft.

5. The combination with the switch, of a shaft arranged transversely of the switch, and connected therewith to operate the same when the shaft is oscillated, a locking device for the switch in connection with the shaft, and means on each side of the switch adapted to be operated by a moving train for throwing the switch, said means comprising a carriage movable longitudinally of the track, an operating arm pivoted thereto and provided with a vertical portion for engagement by mechanism on a moving train to move the carriage in one direction, springs for returning the carriage, means whereby the movement of the carriage will oscillate the shaft, hand operating means for throwing the switch normally connected with the shaft, and means for disconnecting the hand operating means when the switch is to be thrown thereby.

6. The combination with the switch, of a shaft arranged transversely of the switch, and connected therewith to operate the same when the shaft is oscillated, a locking device for the switch in connection with the shaft, and means on each side of the switch adapted to be operated by a moving train for throwing the switch, said means comprising a carriage movable longitudinally of the track, an operating arm pivoted thereto and provided with a vertical portion for engagement by mechanism on a moving train to move the carriage in one direction, springs for returning the carriage, means whereby the movement of the carriage will oscillate the shaft, independent means for throwing the switch connected with the locking device, a hand lever for operating said means, and means operated by the hand lever for disconnecting the independent means from the locking device.

7. The combination with the switch, of a shaft arranged transversely of the switch, and connected therewith to operate the switch when the shaft is oscillated, and means on each side of the switch adapted to be operated by a moving train for throwing the switch, said means comprising carriages slidable longitudinally of the track, and connected with the shaft, a spring supported operating arm in connection with each carriage and adapted for engagement by mechanism on a moving train for moving the carriage in one direction, springs for returning the carriage, a locking device for the switch in connection with the shaft, said device comprising a fixed sleeve on the shaft, and in which the shaft is journaled, a sleeve slidable on the shaft and rotatable therewith, and a spring for normally retaining said sleeves in contact, said sleeves being provided with coöperating teeth having their sides inclined in opposite directions.

8. The combination with the switch, of a locking device therefor, said device comprising a shaft journaled transversely of the track, and connected with the switch, a fixed sleeve at the center of the shaft, and in which the shaft is journaled, said sleeve being provided at each end with teeth, having their sides inclined in opposite directions, sleeves slidable longitudinally of the shaft, said sleeves being arranged on each side of the first sleeve and provided with teeth coöperating with the teeth of the first sleeve, springs normally moving said sleeves toward the first sleeve, means on each side of the switch adapted for engagement by a moving train for operating the switch, independent means, for operating the switch normally connected with the shaft, and means for disconnecting the independent means from the shaft when the switch is to be operated by said independent means.

9. The combination with the switch, of a locking device therefor, said device comprising a shaft journaled transversely of the track, and connected with the switch, a fixed sleeve in which the shaft is journaled, said sleeve being provided with teeth having their side edges inclined at the same angle in opposite directions, sleeves slidable longitudinally of the shaft and rotatable therewith, and provided with teeth coöperating with the teeth of the first named sleeve, springs acting to move said sleeves together, means on each side of the switch adapted for engagement by a moving train for operating the switch, independent means for operating the switch normally connected with the shaft, and means for disconnecting the independent means from the shaft, when the switch is to be operated by said independent means.

10. The combination with the switch, of a locking device therefor, said device comprising a shaft journaled transversely of the track, and connected with the switch, a fixed sleeve in which the shaft is journaled, said sleeve being provided with teeth having their side edges inclined at the same angle in opposite directions, sleeves slidable longitudinally of the shaft and rotatable therewith, and provided with teeth coöperating with the teeth of the first named sleeve, springs acting to move said sleeves together, and means on each side of the switch adapted for engagement by a moving train for operating the switch.

11. The combination with the switch, of a locking device therefor, said device comprising a shaft journaled transversely of the track, and connected with the switch, a fixed sleeve in which the shaft is journaled, said sleeve being provided with teeth having their side edges inclined at the same angle in opposite directions, sleeves slidable longitudinally of the shaft, and rotatable therewith, and provided with teeth coöperating with the teeth of the first named sleeve, and springs acting to move said sleeves together.

12. The combination with the switch, of a locking device for the switch, said device comprising a shaft journaled transversely of the track, and connected with the switch operating means, a fixed sleeve in which the shaft is journaled, said sleeve being provided at its ends with teeth having their sides inclined in opposite directions at the same angle, sleeves rotatable with the shaft and slidable longitudinally thereof, said sleeves being arranged on each side of the first sleeve and provided with teeth coöperating with the teeth of the first sleeve, and springs normally moving said sleeves toward each other.

13. The combination with the switch, of a locking device therefor, said device comprising a shaft journaled transversely of the track, and connected with the switch, a fixed sleeve in which the shaft is journaled, said sleeve being provided with teeth having their sides inclined in opposite directions, a sleeve rotatable with the shaft and slidable longitudinally thereof, and provided with teeth coöperating with the teeth of the first sleeve, and springs normally moving the sleeves toward each other.

14. In a device of the class described, a switch, means arranged upon each side of the switch adapted to be operated by a moving train for operating the switch, a locking device for the switch, hand operated means for operating the switch, said means comprising a vertical shaft adapted to support a signal and normally connected with the locking device, a casing in which the shaft is journaled, a cover rotatable on the casing, and provided with a square opening through which the shaft passes, said shaft having a square portion in the opening, a lever pivoted to the cover, and provided with a forked portion for engaging the square portion whereby to depress the shaft, means whereby the depression of the shaft will disconnect it from the locking device, means for locking the lever in inoperative position, and means whereby the locking of the lever in inoperative position will prevent the disconnection of the shaft from the locking device for the switch.

15. In a device of the class described, a switch, means arranged upon each side of the switch adapted to be operated by a moving train for operating the switch, a locking device for the switch, hand operated means for operating the switch, said means comprising a vertical shaft adapted to support a signal and normally connected with the locking device, a hand lever, a support to which the lever is pivoted, means in connection with the support and the shaft for permitting said shaft to move longitudinally with respect thereto, and for constraining the shaft to rotate therewith, means in connection with the lever for depressing the shaft, means whereby the depression of the shaft will disconnect it from the locking device, means for locking the lever in inoperative position, and means whereby the locking of the lever in inoperative position will prevent the disconnection of the shaft from the locking device for the switch.

16. In a device of the class described, a switch, means arranged upon each side of the switch adapted to be operated by a moving train for operating the switch, a locking device for the switch, hand operated means for operating the switch, said means comprising a vertical shaft adapted to support a signal and normally connected with the locking device, a hand lever, a support to which the lever is pivoted, means in connection with the support and the shaft for permitting the said shaft to move longitudinally with respect thereto and for constraining the shaft to rotate therewith, means in connection with the lever for depressing the shaft, means whereby the depression of the shaft will disconnect it from the locking device, and means for locking the lever in inoperative position.

17. In a device of the class described, a switch, means arranged upon each side of the switch adapted to be operated by a moving train for operating the switch, a locking device for the switch, hand operated means for operating the switch, said means comprising a vertical shaft, adapted to support a signal and normally connected with the locking device, a hand lever, a support to which the lever is pivoted, means in connection with the support and the shaft for permitting said shaft to move longitudinally with respect thereto, and for constraining the shaft to rotate therewith, means in connection with the lever for depressing the shaft, and means whereby the depression of the shaft will disconnect it from the locking device.

18. In a device of the class described, a switch, means arranged upon each side of the switch adapted to be operated by a moving train for operating the switch, a locking device for the switch, manual means for operating the switch, said means comprising a vertical shaft adapted to support a signal and normally connected with the locking device, a hand lever for rotating the shaft, means whereby the movement of the hand lever into position for rotating the shaft will release the connection between the shaft and the locking device, and means for locking the lever in inoperative position.

19. In a device of the class described, a switch, means arranged upon each side of the switch adapted to be operated by a moving train for operating the switch, a locking device for the switch, hand operated means for operating the switch, said means comprising a vertical shaft adapted to support a signal, and normally connected with the locking device, a hand lever for rotating the shaft, and means whereby the movement of the hand lever into position for rotating the shaft will release the connection between the shaft and the locking device.

20. In a device of the class described, a switch, means arranged on each side of the switch for engagement by a moving train, whereby to operate the switch, a locking device for the switch, independent means for operating the switch, connected with the locking device, said means comprising a shaft for supporting a signal, a connection between the shaft and the switch whereby the oscillation of the shaft will operate the switch, said shaft being normally connected with the train operated means, and the locking device, a hand lever for oscillating the shaft normally disconnected therefrom, and means whereby the connection of the hand lever with the shaft to oscillate the same will disconnect the shaft from the train operated means, and from the locking device.

21. In a device of the class described, a switch, means arranged on each side of the switch, and adapted to be operated by a moving train for throwing the switch, a locking device for the switch, means whereby the train operated means will operate the locking device, independent means for throwing the switch connected with the locking device, a hand lever for operating said means, and means operated by the hand lever for disconnecting the independent means from the locking device.

22. In a device of the class described, a switch, means arranged upon each side of the switch adapted to be operated by a moving train for throwing the switch, a locking device for the switch, means whereby the train operated means will operate the locking device, hand operated means for throwing the switch connected with the locking device, and means for disconnecting the hand operated means from the locking device.

23. In a device of the class described, a switch, means arranged upon each side of the switch, adapted to be operated by a moving train for operating the switch, and a locking device for the switch operated by the said means.

24. In a device of the class described, a longitudinally movable pivotally mounted operating arm, comprising a horizontal portion and a vertical portion for engagement by mechanism on a moving train whereby to move the arm longitudinally, means for retaining the arm in engaging position until the arm has completed its longitudinal movement, and means for returning the arm to its original position.

25. In a device of the class described, the combination with the switch, of a longitudinally movable operating arm adapted for engagement by mechanism on a moving train to operate the switch, means for retaining the arm in vertical position for engagement by said means until the arm has reached the end of its travel, and for permitting it to take a horizontal position at the end of its travel for the purpose set forth.

26. The combination with the switch, of means for operating the switch adapted for engagement by a moving train, a locking device for the switch operated by the said means, a signal shaft operated by said means, a hand operated device for operating the switch normally connected with the locking device and the said means, and means for releasing the hand operated device from the locking means and the train operated means.

PETER McGRATH.

Witnesses:
MARTIN SCHIIK,
ERNEST BLOEDORN.